(12) United States Patent
Berg et al.

(10) Patent No.: US 12,599,130 B2
(45) Date of Patent: *Apr. 14, 2026

(54) LIQUID AGRICULTURAL ADJUVANT

(71) Applicant: Oro Agri Inc., Fresno, CA (US)

(72) Inventors: Paulo Sergio Berg, Londrina (BR); Melvin Donovan Pullen, Burbank, CA (US); Dirk Barnard, Clovis, CA (US); Jared Vanderzyl, Clovis, CA (US)

(73) Assignee: ORO AGRI INC., Fresno, CA (US)

( * ) Notice: Subject to any disclaimer, the term of this patent is extended or adjusted under 35 U.S.C. 154(b) by 706 days.

This patent is subject to a terminal disclaimer.

(21) Appl. No.: 17/309,943

(22) PCT Filed: Jan. 8, 2020

(86) PCT No.: PCT/IB2020/050113

§ 371 (c)(1),
(2) Date: Jul. 1, 2021

(87) PCT Pub. No.: WO2020/144590

PCT Pub. Date: Jul. 16, 2020

(65) Prior Publication Data

US 2023/0157280 A1 May 25, 2023

Related U.S. Application Data

(60) Provisional application No. 62/789,656, filed on Jan. 8, 2019, provisional application No. 62/789,657, filed on Jan. 8, 2019, provisional application No. 62/789,649, filed on Jan. 8, 2019.

(51) Int. Cl.
| | |
|---|---|
| *A01N 37/06* | (2006.01) |
| *A01N 25/04* | (2006.01) |
| *A01N 37/02* | (2006.01) |
| *A01N 37/04* | (2006.01) |
| *A01P 3/00* | (2006.01) |

(52) U.S. Cl.
CPC .............. *A01N 37/06* (2013.01); *A01N 25/04* (2013.01); *A01N 37/02* (2013.01); *A01N 37/04* (2013.01); *A01P 3/00* (2021.08)

(58) Field of Classification Search
None
See application file for complete search history.

(56) References Cited

U.S. PATENT DOCUMENTS

| | | | |
|---|---|---|---|
| 4,363,756 A | 12/1982 | Sepulveda et al. | |
| 4,772,427 A | 9/1988 | Dawson et al. | |
| 2007/0179077 A1 | 8/2007 | Formstone et al. | |
| 2010/0160168 A1 | 6/2010 | Lindner | |
| 2011/0306495 A1* | 12/2011 | Samarajeewa | A01N 59/16 504/126 |
| 2012/0135910 A1 | 5/2012 | Gross et al. | |
| 2013/0190360 A1 | 7/2013 | Xu et al. | |
| 2018/0077927 A1* | 3/2018 | Bonn | A01N 25/30 |

FOREIGN PATENT DOCUMENTS

| | | |
|---|---|---|
| AU | 2012312570 | 4/2014 |
| CN | 1267188 | 9/2000 |
| CN | 1820598 | 8/2006 |
| CN | 101353860 | 1/2009 |
| CN | 101692811 | 4/2010 |
| CN | 104872114 | 9/2015 |
| JP | H06219901 | 8/1994 |
| JP | H10130103 | 5/1998 |
| JP | 2006-117538 | 5/2006 |
| JP | 2006-241135 | 9/2006 |
| JP | 2007-520448 | 7/2007 |
| WO | WO 94/10975 | 5/1994 |
| WO | WO 99/03343 | 1/1999 |
| WO | WO 2008/097553 | 8/2008 |
| WO | WO 2015/004194 | 1/2015 |
| WO | WO 2016/202572 | 12/2016 |
| WO | WO 2017/083049 | 5/2017 |

OTHER PUBLICATIONS

British Columbia, Acidifying Soils, Soil FactSheet, Dec. 2015, Ministry of Agriculture. <https://www2.gov.bc.ca/assets/gov/farming-natural-resources-and-industry/agriculture-and-seafood/agricultural-land-and-environment/soil-nutrients/600-series/638100-1_acidifying_soils.pdf> (Year: 2015).*

\* cited by examiner

*Primary Examiner* — Ali Soroush
*Assistant Examiner* — Afua Bamfoaa Boateng
(74) *Attorney, Agent, or Firm* — KNOBBE, MARTENS, OLSON & BEAR, LLP

(57) ABSTRACT

A liquid agricultural adjuvant including at least one alkyl ($C_1$-$C_8$) ester of an alkyl ($C_{12}$-$C_{16}$) acid; at least one anionic surfactant; and at least one nonionic surfactant. The liquid agricultural adjuvant has a flash point higher than about 100° C.; and the at least one alkyl ($C_1$-$C_8$) esters of alkyl ($C_{12}$-$C_{16}$) acid has a paraffinic wax dissolution capability of between 2 wt. % to 20 wt. % at 25° C. A method of manufacturing and using the liquid agricultural adjuvant is also included.

7 Claims, No Drawings

LIQUID AGRICULTURAL ADJUVANT

This application is a U.S. National Phase under 35 U.S.C. § 371 of International Application PCT/IB2020/050113, filed Jan. 8, 2020, designating the U.S., and published in English as WO 2020/144590 on Jul. 16, 2020, which claims priority to U.S. Provisional Application Nos. 62/789,649; U.S. 62/789,656; and 62/789,657, all filed Jan. 8, 2019, the entire contents of which are incorporated herein by reference.

FIELD OF THE INVENTION

This disclosure relates to adjuvants, particularly this disclosure relates to a liquid agricultural adjuvant having a flashpoint greater than about 100° C. The adjuvant comprises an at least one alkyl $(C_1-C_8)$ ester of an alkyl $(C_{12}-C_{16})$ acid, an anionic surfactant and a nonionic surfactant, wherein the at least one alkyl $(C_1-C_8)$ ester of an alkyl $(C_{12}-C_{16})$ acid is safe for human and/or animal use.

BACKGROUND OF THE INVENTION

Adjuvants are commonly used in agriculture to improve the performance of pesticides and can be added to the spray tank to improve pesticidal activity or characteristics during application. Spray adjuvants are generally grouped into two broad categories: (i). activator adjuvants which commonly are used to enhance post emergence performance, increase activity, assist with absorption into plant tissue, rain fastness and may include surfactants, crop oil concentrates, nitrogen fertilizers, spreader-stickers, wetting agents, and penetrants; and (ii). water conditioning adjuvants which widen the range of conditions under which a specific formulation is used, which may further alter the physical characteristics of the spray solution and include compatibility agents, buffering agents, pH adjusters, antifoam agents, and drift control agents.

Insecticides, fungicides, miticides, nematicides, herbicides, plant growth regulators, insecticide growth regulators, and nutrients are normally formulated into various kinds of agricultural compositions for use on crops as improvers of health or disease control, or insect control, or weed control and the like. The agricultural compositions may be formulated as liquids including a water base or solvent base, alternatively as soluble or insoluble powders, further alternatively as granules and/or as other solids forms. Fillers, charges, solvents and co-solvents, emulsifiers, dispersing agents and wetting agents are normally incorporated into such compositions to ensure that the pesticidal composition will disperse, dissolve or emulsify in a tank or bath of mixture and provide for continuous stability prior to and upon application. They also serve to ensure optimum delivery and improve the efficacy of the pesticidal active ingredient when the pesticidal agricultural composition is in use. Where utilized, surfactants and adjuvants may impact upon many properties of the agricultural composition such as solubility, volatility, dispersibility, viscosity, particle size, efficacy, and freezing and flash points.

It is known that surfactants that are often incorporated into pesticidal agricultural compositions are not sufficient to fully ensure a stable tank mix when such tank mixes contain multiple components. Thus, it may be necessary to add adjuvants to the tank mix for better stability. Certain adjuvants may improve certain physico-chemical properties of the agricultural composition but may concomitantly worsen other physico-chemical properties. For example, and without being limited to theory, an improvement in solubility may concomitantly provide for increased volatility, decreased viscosity, increased particle size, decreased efficacy, a change in freezing point and/or a decrease in flashpoint. In an example where the flashpoint is decreased the resultant composition will consequently provide for increased risk when in use since the flashpoint is generally known as the lowest temperature at which a liquid can form an ignitable mixture in air near a surface of said liquid. The lower the flashpoint the easier the mixture and/or the surface can ignite. Moreover, the lower the flashpoint the higher the rate of evaporation which in turn decreases efficiency when the agricultural composition is in use.

Surfactants are important and widely used in adjuvants or in co-formulants utilized together with pesticides. It is widely known that adding surfactant-based adjuvants to a tank mixture will provide stabilization of the pesticidal agricultural composition.

Adjuvants based on surfactants and oils are also known to improve performances of chemicals dissolved, emulsified or dispersed into the water or other solvent medium. There is a need for new and innovative adjuvants to agricultural compositions which are both environmentally friendly and provide a low flashpoint and/or a low rate of evaporation when in use. There is further a general need to at least ameliorate the disadvantages known in the prior art.

SUMMARY OF THE INVENTION

In accordance with a first aspect of this disclosure there is provided a liquid agricultural adjuvant, comprising:

at least one alkyl $(C_1-C_8)$ ester of an alkyl $(C_{12}-C_{16})$ acid;

at least one anionic surfactant; and at least one nonionic surfactant;

wherein the liquid agricultural adjuvant has a flash point higher than about 100° C.; and wherein the at least one alkyl $(C_1-C_8)$ esters of alkyl $(C_{12}-C_{16})$ acid has a paraffinic wax dissolution capability of between about 2 wt. % to about 20 wt. % at 25° C.

It is to be understood that the liquid agricultural adjuvant may be provided as a concentrated form which may be diluted with water and/or other solvents. The concentrate may be formulated as an emulsifiable and/or microemulsified concentrate.

The term "microemulsified" as used herein, refers to a dispersion made of water and/or oil and/or surfactant(s) that is an isotropic and thermodynamically stable system. The adjuvant may be diluted for use in water or other chemistries, e.g., solutions of water, glycols and alcohol or other water-miscible liquids, e.g., methanol, ethanol, monoethylene glycol, propylene glycol, or the like.

The at least one alkyl $(C_1-C_8)$ ester of an alkyl $(C_{12}-C_{16})$ acid may be selected from, but not limited to, the group comprising: a natural or synthetic, linear or branched, saturated or unsaturated, modified or unmodified, wherein the alkyl ester may be a compound selected from, but not limited to, the group: methyl esters, ethyl esters, propyl esters, butyl esters, isopropyl ester, isobutyl ester, isopentyl ester, 2-ethylhexyl esters or components or combinations thereof.

The at least one alkyl $(C_1-C_8)$ ester of an alkyl $(C_{12}-C_{16})$ acid may be derived from an alkyl acid selected from, but not limited to, the group comprising: lauric acid, tridecylic acid, myristic acid, pentadecanoic acid, palmitic acid, and combinations thereof.

The at least one alkyl ($C_1$-$C_8$) ester of an alkyl ($C_{12}$-$C_{16}$) acid may be selected from, but not limited to, the group comprising: isobutyl laurate, isopentyl laurate, methyl laurate, 2-ethylhexyl laurate, 2-ethylhexyl palmitate, isopropyl laurate, isopropyl myristate, isopropyl palmitate, and combinations thereof.

The at least one anionic surfactant may be selected from, but not limited to, the group comprising: ($C_6$-$C_{18}$) alkyl benzene sulfonic acid salts, calcium dodecylbenzene sulfonate, sodium dodecylbenzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, and combinations thereof.

The at least one nonionic surfactant may be selected from, but not limited to, the group comprising: natural and/or synthetic ($C_8$-$C_{22}$) alkoxylated fatty alcohols, ($C_8$-$C_{22}$) ethoxylated fatty alcohols, ($C_8$-$C_{22}$) propoxylated fatty alcohols, ($C_8$-$C_{22}$) ethoxylated and propoxylated fatty alcohols, straight chain ($C_4$-$C_{10}$) alkyl(poly)glycosides, branched chain ($C_4$-$C_{10}$) alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof.

The ethoxylated fatty alcohols of fatty acids may have a degree of ethoxylation of from 1 to 50, more preferably 2 to 30, most preferably 3 to 10.

Some alkoxylated alcohols contemplated for use include those based on branched alcohols, such as the Guerbet alcohols, e.g. 2-propylheptanol and 2-ethylhexanol, and $C_{10}$-OXO-alcohol or $C_{13}$ OXO-alcohol, i.e. an alcohol mixture whose main component is formed by at least one branched $C_{10}$-alcohol or $C_{13}$-alcohol, and the alcohols commercially available as Exxal alcohols from Exxon Mobile Chemicals and Neodol alcohols from Shell Chemicals.

The liquid agricultural adjuvant may further comprise an additive selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and water, oil or other solvents, and combinations thereof. The acidifier may be citric acid and/or a derivative of citric acid.

In certain embodiments of the disclosure, the at least one alkyl ($C_1$-$C_8$) ester of an alkyl ($C_{12}$-$C_{16}$) acid may be present in an amount of between about 0.1 wt. % to about 30 wt. %, the at least one anionic surfactant may be present in an amount of between about 1 wt. % to about 50 wt. %, and the at least one nonionic surfactant may be present in an amount of between about 1 wt. % to about 50 wt. %. This embodiment may provide the liquid agricultural adjuvant in concentrate form. It is to be understood that the liquid agricultural adjuvant may further be diluted with water or other solvents.

In other embodiments of the disclosure, the at least one alkyl ($C_1$-$C_8$) ester of an alkyl ($C_{12}$-$C_{16}$) acid may be present in an amount of between about 0.1 wt. % to about 20 wt. %, preferably between about 2 wt. % to about 15 wt. %, the at least one anionic surfactants may be present in an amount of between about 3 wt. % to about 20 wt. %, and wherein the at least one nonionic surfactant is present in an amount of between about 5 wt. % to about 30 wt. %. This embodiment may provide the liquid agricultural adjuvant in concentrate form. It is to be understood that the liquid agricultural adjuvant may further be diluted with water or other solvents.

The liquid agricultural adjuvant may further comprise water and/or other additives, typically such that the liquid agricultural adjuvant may comprise from about 0.1 to about 20 wt. % of the at least one alkyl ($C_1$-$C_8$) ester of an alkyl ($C_{12}$-$C_{16}$) acid; and from about 1 to about 50 wt. % of the at least one anionic surfactant, and from about 1 to about 50 wt. % of the at least one nonionic surfactant, and from about 2 to about 80 wt. % of the water and/or other additives. This embodiment may still provide the liquid agricultural adjuvant in concentrate form.

In an example embodiment of the disclosure there is provided a liquid agricultural adjuvant comprising at least one alkyl ($C_1$-$C_8$) ester of an alkyl ($C_{12}$-$C_{16}$) acid present in an amount of between about 0.1 wt. % to about 30 wt. %, preferably between about 2 wt. % to about 15 wt. %; an at least one anionic surfactant present in an amount of between about 3 wt. % to about 20 wt. %; and an at least one nonionic surfactant present in an amount of between about 5 wt. % to about 30 wt. %; and wherein the at least one alkyl ($C_1$-$C_8$) ester of an alkyl ($C_{12}$-$C_{16}$) acid is selected from, but not limited to, the group comprising: isobutyl laurate, isopentyl laurate, methyl laurate, 2-ethylhexyl laurate, 2-ethylhexyl palmitate, isopropyl laurate, isopropyl myristate, isopropyl palmitate, and combinations thereof; and wherein the at least one anionic surfactant is selected from, but not limited to, the group comprising: ($C_6$-$C_{18}$) alkyl benzene sulfonic acid salts, calcium dodecylbenzene sulfonate, sodium dodecylbenzene sulfonate, amine ($C_6$-$C_{18}$) alkyl benzene sulfonate, triethanolamine dodecylbenzene sulfonates, ($C_6$-$C_{18}$) alkyl ether sulfates, ($C_6$-$C_{18}$) alkyl ethoxylated ether sulfates, ($C_6$-$C_{18}$) alkyl sulfates, lauryl ether polyethoxylated sodium sulfate, ($C_6$-$C_{18}$) alkyl phosphate esters, ($C_6$-$C_{18}$) alkoxylated sulfates, ($C_6$-$C_{18}$) alkoxylated phosphate esters, xylene sulfonate salts, cumene sulfonate salts, and combinations thereof; and wherein the at least one nonionic surfactant is selected from, but not limited to, the group comprising: ($C_8$-$C_{22}$) alkoxylated fatty alcohols, ($C_8$-$C_{22}$) ethoxylated fatty alcohols, ($C_8$-$C_{22}$) propoxylated fatty alcohols, ($C_8$-$C_{22}$) ethoxylated and propoxylated fatty alcohols, straight chain ($C_4$-$C_{10}$) alkyl(poly)glycosides, branched chain ($C_4$-$C_{10}$) alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof.

The example embodiment of the disclosure may further comprise water as a diluent and/or other additives, wherein the liquid agricultural adjuvant comprises from about 0.1 wt. % to about 20 wt. % of the at least one alkyl ($C_1$-$C_8$) ester of an alkyl ($C_{12}$-$C_{16}$) acid; and about 1 wt. % to about 50 wt. % of the at least one anionic surfactant, and about 1 wt. % to about 50 wt. % of the at least one nonionic surfactant, and about 2 wt. % to about 80 wt. % of the water and/or other additives. This embodiment may still provide the liquid agricultural adjuvant in concentrate form.

The additives may be at least one selected from, but not limited to, the group comprising: preservatives, clarifiers, anti-freezing agents, hydrotropes, stabilizers, antioxidants, acidifiers, chelates, complexing agents, dyes, rheology modifiers, antifoams, anti-drift and water, oil or other solvents, and combinations thereof. The acidifier may be citric acid and/or a derivative thereof.

The oil may be a natural compound, modified by esterification or transesterification, such as an alkyl fatty acid ester, e.g., methyl esters, ethyl esters, propyl esters, butyl esters, 2-ethylhexyl esters or dodecyl esters, and is preferably a glycol or glycerol fatty acid, such as ($C_{10}$-$C_{22}$) fatty acid esters, such as from vegetables oils, preferably oil-yielding plants species such as soybean, corn, sunflower, rapeseed oil, cottonseed oil, linseed oil, palm oil, safflower, coconut oil, castor oil, olive oil, canola oil among others pure or mixed with an essential or edible oil extracted from a variety of plants or parts of plants such as trees, shrubs, leaves, flowers, grasses, fluids, herbs, fruits and seeds, or mixed with each other that are combined with one or more oils.

In further embodiments, the oil may be a natural compound, such as an essential oil, a citrus oil, a component of a citrus oil, a terpene oil, wherein the terpene oil comprises a D-limonene or one or more terpene containing natural oils, wherein the one or more terpene containing natural oils contains at least 50% of a terpene selected from the group consisting of orange oil, grapefruit oil, lemon oil, lime oil, tangerine oil, pine oil, pure, combined with other oils or combinations thereof.

The liquid agricultural adjuvant (in concentrate form) may have a flash point over 100° C. measured in a closed cup device, and wherein the at least one alkyl ($C_1$-$C_8$) ester of an alkyl ($C_{12}$-$C_{16}$) acid may have a paraffinic wax (CAS number 8002-74-2) dissolution capability of at least 2 wt. % at 25° C., and wherein the emulsifiable and/or microemulsified liquid adjuvant may be diluted to provide a dilute liquid agricultural adjuvant to be applied in tank mixes or irrigation system mixed with water and/or other chemistries at a rate of 1:5000 to 1:10 to be applied via air assisted sprayers, conventional sprayers, ultra-low volumes equipment such as aerial, electrostatic, foggers and misting spray equipment and chemigation systems such as pivots an sprinklers.

The liquid agricultural adjuvant according to the first aspect of this disclosure provides for a stable emulsifiable and/or microemulsified liquid safe adjuvant concentrate with a high flash point (greater than about 100° C.) and an epicuticular wax compatibility that promotes bio-efficacy for use with industrial, turf, ornamental, horticultural and agricultural fields of endeavor. The liquid agricultural adjuvant provides improvement of penetration of an active ingredient (nutrient, pesticide, or the like) through the epicuticular of a target crop or pest.

In accordance with a second aspect of this disclosure there is provided a method of diluting a liquid agricultural adjuvant, comprising:

diluting the adjuvant concentrate prepared according as described in the first aspect of the disclosure above with water at a ratio by weight of liquid agricultural adjuvant to water 1:5000 to 1:10 to yield a stable diluted emulsion and/or microemulsion. It is to be understood that the water may further contain at least one agricultural compound selected from, but not limited to, the group comprising: insecticides, fungicides, herbicides, desiccants, defoliants, acaricides, nutrients, miticides, bactericides, biocides, ovicides, nematicides, insect growth regulators, plant growth regulators, and combinations thereof.

The method wherein the liquid agricultural adjuvant may be diluted in a at least one of, but not limited to, the following group: a mixing tank, a spray tank, a container, or an inline irrigation system, therein providing the diluted liquid agricultural adjuvant which may be a stable diluted emulsion or microemulsion that facilitates rain-fastness through accelerated uptake into the plant owing to for example wax dissolution capability of the adjuvant.

The method wherein the stable diluted emulsion and/or microemulsion may be applied on at least one member of, but not limited to, the group comprising: plants, weeds, seeds, soil, urban places, and forests, via an apparatus selected from, but not limited to, the group comprising: air assisted sprayers, conventional sprayers, ultra-low volumes equipment such as aerial, electrostatic, foggers and misting spray equipment and chemigation systems, pivots, sprinklers, and combinations thereof. The disclosure extends to uses of the liquid agricultural adjuvant.

DETAILED DESCRIPTION

The content of the Summary is repeated herein by way of reference thereto to avoid repetition. Generally there is provided a stable emulsifiable and/or microemulsified liquid adjuvant with a high flash point above 100° C. having epicuticular wax compatibility that promotes bio-efficacy and provides improvement of penetration of an active ingredient (nutrient, pesticide, or the like) through the epicuticular of a target crop or pest.

Generally, a first aspect of the disclosure provides for a liquid agricultural adjuvant, comprising: at least one alkyl ($C_1$-$C_8$) ester of an alkyl ($C_{12}$-$C_{16}$) acid; at least one anionic surfactant; and at least one nonionic surfactant. The liquid agricultural adjuvant has a flash point higher than about 100° C.; and the at least one alkyl ($C_1$-$C_5$) esters of alkyl ($C_{12}$-$C_{16}$) acid has a paraffinic wax (CAS number 8002-74-2) dissolution capability of between 2 wt. % to 20 wt. % at 25° C.

The disclosure extends to a method of manufacturing the liquid agricultural adjuvant according to the first aspect and methods of use, typically wherein an agricultural field of endeavor.

Definitions

The term "adjuvant" as used herein is a broad term, and is to be given its ordinary and customary meaning to a person of ordinary skill in the art (and is not to be limited to a special or customized meaning), and refers without limitation to an agent that modifies the effect of other agents and more particularly used to enhance the effectiveness of pesticides such as herbicides, insecticides, fungicides and other agents.

The term "stable" as used herein is a broad term, combined or related with the term "emulsion", and is to be given its ordinary and customary meaning to a person of ordinary skill in the art (and is not to be limited to a special or customized meaning), and refers without limitation to the emulsion stability, i.e. the ability of an emulsion to resist change in its properties over time so that the size of the droplets in emulsion does not change significantly with time. more specifically during the time of an application to the targets mixed with water, it is thus to be given its ordinary meaning that is customary to a person skilled in the art. The term "stable" as used herein is a broad term, combined or related with the term "accelerated storage stability", means that the formulation keep similar performance in terms of physico-chemical properties after samples be stored during 15 days in at least 3 conditions: room temperature (around 20° C.); cold temperature (0° C. or 5° C.); hot temperature (54° C.). Storage stability tests were conducted according Method CIPAC MT 36.

The term "solvents" as used herein is a broad term, and is to be given its ordinary and customary meaning to a person of ordinary skill in the art (and is not to be limited to a special or customized meaning), and refers without limitation to compounds with some characteristics of solvency for other compounds or means, that can be polar or non-polar, linear or branched, cyclic or aliphatic, aromatic, naphthenic and that includes but is no limited to: alcohols, esters, diesters, ketones, acetates, terpenes, sulfoxides, glycols, paraffins, hydrocarbons, anhydrides, heterocyclics, among others.

Whenever a group is described as being "optionally substituted" that group may be unsubstituted or substituted with one or more of the indicated substituents. Likewise, when a group is described as being "unsubstituted or substituted" if substituted, the substituent(s) may be selected from one or more the indicated substituents. If no substituents are indicated, it is meant that the indicated "optionally substituted" or "substituted" group may be substituted with one or more group(s) individually and independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl) alkyl, hydroxy, protected hydroxyl, alkoxy, aryloxy, acyl, mercapto, alkylthio, arylthio, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, an amino, a mono-substituted amino and a di-substituted amino group, and protected derivatives thereof.

The term "alkyl" as used herein is a broad term, and is to be given its ordinary and customary meaning to a person of ordinary skill in the art (and is not to be limited to a special or customized meaning), and refers without limitation to a straight chain or branched, acyclic or cyclic, unsaturated or saturated aliphatic hydrocarbon containing 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36 or more carbon atoms, while the term "lower alkyl" has the same meaning as alkyl but contains 1, 2, 3, 4, 5, or 6 carbon atoms. Representative saturated straight chain alkyls include methyl, ethyl, n-propyl, n-butyl, n-pentyl, n-hexyl, and the like; while saturated branched alkyls include isopropyl, sec-butyl, isobutyl, tert-butyl, isopentyl, and the like. Unsaturated alkyls contain at least one double or triple bond between adjacent carbon atoms (referred to as an "alkenyl" or "alkynyl," respectively). Representative straight chain and branched alkenyls include ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include acetylenyl, propynyl, 1-butynyl, 2-butynyl, 1-pentynyl, 2-pentynyl, 3-methyl-1 butynyl, and the like. Typical alkyl groups include, but are in no way limited to, methyl, ethyl, propyl, isopropyl, butyl, isobutyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, henatriacontyl, dotriacontyl, tritriacontyl, tetratriacontyl, pentatriacontanyl, and hexatriacontanoic. The alkyl group may be substituted or unsubstituted.

The term "alkoxy" as used herein is a broad term, and is to be given its ordinary and customary meaning to a person of ordinary skill in the art (and is not to be limited to a special or customized meaning), and refers without limitation to an alkyl moiety attached through an oxygen bridge (i.e., —O-alkyl) such as methoxy, ethoxy, and the like.

The term "thioalkyl" as used herein is a broad term, and is to be given its ordinary and customary meaning to a person of ordinary skill in the art (and is not to be limited to a special or customized meaning), and refers without limitation to an alkyl moiety attached through a sulfur bridge (i.e., —S-alkyl) such as methylthio, ethylthio, and the like.

The term "alcohol" as used herein is a broad term, and is to be given its ordinary and customary meaning to a person of ordinary skill in the art (and is not to be limited to a special or customized meaning), and refers without limitation to any compound as described herein incorporating one or more hydroxy groups, or being substituted by or functionalized to include one or more hydroxy groups.

The term "ester" as used herein is a broad term, and is to be given its ordinary and customary meaning to a person of ordinary skill in the art (and is not to be limited to a special or customized meaning), and refers without limitation to any compound as described herein incorporating one or more ester groups, e.g., monoester, diester, triester, or polyester, or being substituted by or functionalized to include one or more ester groups. Esters include but are not limited to fatty acid esters.

The term "acetates" as used herein is a broad term, and is to be given its ordinary and customary meaning to a person of ordinary skill in the art (and is not to be limited to a special or customized meaning), and refers without limitation to any compound as described herein incorporating one or more acetate groups, such as salts, esters or other compounds incorporating a $CH_3COO$— moiety.

The term "terpenes" as used herein is a broad term, and is to be given its ordinary and customary meaning to a person of ordinary skill in the art (and is not to be limited to a special or customized meaning), and refers without limitation to any compound as derived from resins of plants such as conifers, or to synthetically produced compounds having the same structures as plant derived terpenes. Terpenes can include hydrocarbons as well as terpenoids containing additional functional groups, as well as essential oils. Terpenes can include compounds having a formula $(C_5H_8)_n$ where n is the number of linked isoprene units (e.g., 1, 2, 3, 4, 5, 6, 7, 8, 9, 10, or more).

The term "terpene containing natural oil" as used herein is a broad term, and is to be given its ordinary and customary meaning to a person of ordinary skill in the art (and is not to be limited to a special or customized meaning), and refers without limitation to a natural oil which may contain at least 50% of a terpene selected from but not exclusively from the group consisting of orange oil, grapefruit oil, lemon oil, lime oil, tangerine oil, and pine oil or components thereof.

The term "sulfoxides" as used herein is a broad term, and is to be given its ordinary and customary meaning to a person of ordinary skill in the art (and is not to be limited to a special or customized meaning), and refers without limitation to any compound as described herein incorporating one or more sulfinyl (SO) groups, or being substituted by or functionalized to include one or more sulfinyl groups.

The term "glycols" as used herein is a broad term, and is to be given its ordinary and customary meaning to a person of ordinary skill in the art (and is not to be limited to a special or customized meaning), and can include diols, e.g., polyalkylene glycols such as polyethylene glycols (polymers having the formula H $(OCH_2CH_2)_nOH$ where n is greater than three), polypropylene glycols, or glycols incorporating monomers comprising longer hydrocarbon chains.

The term "paraffins" as used herein is a broad term, and is to be given its ordinary and customary meaning to a person of ordinary skill in the art (and is not to be limited to a special or customized meaning), and refers without limitation to heavier alkanes, such as alkanes forming a liquid or wax at room temperature, as well as functionalized paraffins, e.g., chlorinated paraffins, and mineral or synthetic oils comprising hydrocarbons. Room temperature as used herein refers to ambient conditions, e.g., in a climate controlled building, for example, approximately 20° C.

The term "hydrocarbons" as used herein is a broad term, and is to be given its ordinary and customary meaning to a person of ordinary skill in the art (and is not to be limited to a special or customized meaning), and refers without limitation to any compound comprising only carbon and hydrogen atoms. A functionalized or substituted hydrocarbon has one or more substituents as described elsewhere herein.

The term "anhydrides" as used herein is a broad term, and is to be given its ordinary and customary meaning to a person of ordinary skill in the art (and is not to be limited to a special or customized meaning), and refers without limitation to any compound as described herein incorporating one or more anhydride groups (of formula $(RC(O))_2O)$, or being substituted by or functionalized to include one or more anhydride groups.

The term "sulfonic acid" as used herein is a broad term, and is to be given its ordinary and customary meaning to a person of ordinary skill in the art (and is not to be limited to a special or customized meaning), and refers without limitation to, for example formic, acetic, succinic, lactic, malic, tartaric, citric, ascorbic, nicotinic, methanesulfonic, ethanesulfonic, p-toluensulfonic, salicylic or naphthalene sulfonic acid. Sulfonic acids can include hydrocarbyl sulfonic acids, such as aryl sulfonic acids, alkyl benzene sulfonic acid, among other.

The term "vegetable oil" as used herein is a broad term, and is to be given its ordinary and customary meaning to a person of ordinary skill in the art (and is not to be limited to a special or customized meaning), and refers without limitation to oleaginous fatty acid constituents of vegetable matter, e.g., saturated fatty acids, monounsaturated fatty acids, polyunsaturated fatty acids, etc. The vegetable oil can be functionalized, e.g., alkoxylated, hydroxylated, aminated, etc. A functionalized vegetable oil is a derivative of a vegetable oil or other fatty substance, or a substance having a similar composition regardless of the origin of the substance. In some embodiments, the functionalized vegetable oil is epoxidized unsaturated triglyceride. Epoxidized unsaturated triglyceride is a tri-ester of glycerine. The glycerine bonds to three linear or branched carboxylic acids, wherein at least one of the carboxylic acids comprises an epoxide moiety. For example, the epoxidized unsaturated triglyceride may be a derivative of an unsaturated fatty acid triglyceride such as a vegetable or animal fat or oil, wherein at least one of the C═C moieties of the parent unsaturated fatty acid triglyceride is replaced with an epoxide moiety (i.e. a three-membered ring containing an oxygen). If the parent unsaturated fatty acid triglyceride has more than one C═C moiety, one, part, or all of the C═C moieties may be replaced by epoxide moieties. When the term "vegetable oil" is used herein, it is understood to include animal fats, or oils of synthetic origin, having a same chemical structure as a vegetable oil. Examples of vegetable or animal fats or oils include coconut oil, corn oil, cottonseed oil, olive oil, palm oil, peanut oil, rapeseed oil, canola oil, safflower oil, sesame oil, soybean oil, sunflower oil, castor oil, tallow oil, or the like.

As used herein, the abbreviations for any compound, is, unless indicated otherwise, in accord with its common usage, recognized abbreviations, or the IUPAC-IUB Commission on Biochemical Nomenclature (See, Biochem. 11:942-944 (1972)).

Any percentages, ratios or other quantities referred to herein are on a weight basis, unless otherwise indicated.

The cyclic systems referred to herein include fused ring, bridged ring, and spiro ring moieties, in addition to isolated monocyclic moieties.

EXAMPLES

The examples here below are not to be considered as limiting to the disclosure. The broad disclosures made in the Summary and Detailed Description herein above are repeated by way of reference.

Wax Solubility Test

Method of Preparation of the Paraffin Wax Solubility Test

A method to evaluate the capability of a solvent to dissolve paraffin wax was developed and it helps to understand how will be performed certain solvent when applied to an epicuticular surface of a plant.

The method for preparing a Paraffin Wax solubility test that define a speed which a solvent dissolve a paraffin wax (CAS number 8002-74-2) during the time, in a period of at least 24 hours. Steps to conduct the test are: a) weigh 98 grams of solvent into 8 oz glass jar along; b) place jar with solvent onto laboratory balance and tare weight; c) add 2 grams of molten (at 110° F. or 43.3° C.) paraffins wax into solvent, put a 1 inch magnetic stir bar inside and cap; d) place the jar containing the solvent with paraffins wax sample onto magnetic stir plate and begin stirring at 350 rpm-start a clock counter each sample; e) observe and record time when the entire amount of paraffins wax has dissolved, or not.

TABLE 1

| | Results of performance of solvents to dissolve paraffin wax | | | | |
|---|---|---|---|---|---|
| CHEMICAL NAME | SAMPLE WEIGHT (g) | TEMPERATURE (° C.) | PARAFFIN WAX (g) | DISSOLUTION TIME (MINUTES) | OBSERVATION |
| COLD PRESSED ORANGE OIL | 98 | 25 | 2.0 | 3 | STABLE AT 25° C. |
| LPA 210 SOLVENT | 98 | 25 | 2.0 | 30 | STABLE AT 25° C. |
| ISOPROPYL LAURATE | 98 | 25 | 2.0 | 102 | STABLE AT 25° C. |
| AROMATIC 200 | 98 | 25 | 2.0 | 197 | STABLE AT 25° C. |

TABLE 1-continued

Results of performance of solvents to dissolve paraffin wax

| CHEMICAL NAME | SAMPLE WEIGHT (g) | TEMPERATURE (° C.) | PARAFFIN WAX (g) | DISSOLUTION TIME (MINUTES) | OBSERVATION |
|---|---|---|---|---|---|
| METHYL CAPRYLATE/CAPRATE | 98 | 25 | 2.0 | 205 | STABLE AT 25° C. |
| METHYL LAURATE | 98 | 25 | 2.0 | 300 | STABLE AT 25° C. |
| ISOBUTYL LAURATE | 98 | 25 | 2.0 | 340 | STABLE AT 25° C. |
| ISOAMYL LAURATE | 98 | 25 | 2.0 | 620 | STABLE AT 25° C. |
| ISOPROPYL MYRISTATE | 98 | 25 | 2.0 | 627 | STABLE AT 25° C. |
| 2-ETHYLHEXYL LAURATE | 98 | 25 | 2.0 | 930 | STABLE AT 25° C. |
| N,N-DIMETHYLDECANAMIDE | 98 | 25 | 2.0 | — | UNDISSOLVED AFTER 24-HOURS STIRRING |
| BUTYL CELLUSOLVE | 98 | 25 | 2.0 | — | UNDISSOLVED AFTER 24-HOURS STIRRING |
| TETRAHYDROFURFURAL ALCOHOL | 98 | 25 | 2.0 | — | UNDISSOLVED AFTER 24-HOURS STIRRING |
| DIMETHYL SULFOXIDE | 98 | 25 | 2.0 | — | UNDISSOLVED AFTER 24-HOURS STIRRING |
| PROPYLENE CARBONATE | 98 | 25 | 2.0 | — | UNDISSOLVED AFTER 24-HOURS STIRRING |
| METHYL PALMITATE/OLEATE | 98 | 25 | 2.0 | — | UNDISSOLVED AFTER 24-HOURS STIRRING |
| METHYL SOYATE | 98 | 25 | 2.0 | — | UNDISSOLVED AFTER 24-HOURS STIRRING |
| CYCLOHEXANONE | 98 | 25 | 2.0 | — | UNDISSOLVED AFTER 24-HOURS STIRRING |

Examples of Products According the Present Disclosure
Method of Preparation of the Adjuvant Concentrate For the purpose of illustration, the method for preparing the liquid agricultural adjuvant (in its concentrate form) as used in the non-limiting examples, includes the following steps: (i) admixing into a vessel with a portion of water and/or oil, (ii) adding at least one anionic surfactant such as a sodium lauryl ether sulfate, (iii) adding at least one nonionic surfactant such a fatty alcohol ethoxylated, and (iv) adding at least one solvent form the group of alkyl ($C_1$-$C_8$) esters of alkyl ($C_{12}$-$C_{16}$) acids such as isopropyl myristate and/or isopropyl laurate. The method may optionally include an additional further step (v) adding at least one additive such as, but not limited to, a preservative and/or a colorant. Typically, the steps above are conducted in sequence from step (i) to step (iv) and further the optional step (v). The admixture is continuously stirred. Heating is not necessarily required but may advantageously be employed depending on the physical state of each compound. For certain components, lower temperatures or higher temperatures may be employed. The temperature can be selected so as to facilitate mixing within a desired time period, while avoiding degradation or undesired reaction of the components. Other additives can also be added for specific purposes, such as, but not limited to, clarifiers, anti-foaming agents, anti-freezing agents, hydrotropes, acidifiers, UV stabilizers, colorants, nutrients, amino-acids, sea extract, anti-drift agents, anti-freezing agents, and water, oil or other solvents and combinations thereof.

The agricultural adjuvant composition may comprise various ratios of components, typically the adjuvant composition, in its concentrated liquid form, comprises from about 1 to about 30% of the at least one alkyl ($C_1$-$C_8$) esters of alkyl ($C_{12}$-$C_{16}$) acids; from about 1 to about 30% by weight the at least one anionic surfactant; from about 1 to about 40% by weight of one or more nonionic surfactants; and from about 2 to about 80% of water, oils or other additives.

More specifically the agricultural adjuvant composition, in its concentrated liquid form, comprises from 1 to 30 wt. % of the at least one alkyl ($C_1$-$C_8$) esters of alkyl ($C_{12}$-$C_{16}$) acids—preferably between to 3 to 12 wt. % by weight; the at least one anionic surfactant comprises from 1 to 30 wt. % by weight-preferably from 3 to 20% by weight; the at least one nonionic surfactant from 1 to 40 wt. % by weight-preferably from 5 to 30 wt. % by weight; and wherein the water, oils or other additives are from 20 to 70 wt. % by weight-preferably from 30 to 65 wt. % by weight. In other words, where the agricultural adjuvant composition has a weight of 100 g it comprises 1 to 30 g of the at least one alkyl ($C_1$-$C_8$) esters of alkyl ($C_{12}$-$C_{16}$) acids—preferably between to 3 to 12 g; the at least one anionic surfactant comprises from 1 to 30 g-preferably from 3 to 20 g; the at least one nonionic surfactant from 1 to 40 g-preferably from 5 to 30 g; and wherein the water, oils or other additives are from 20 to 70 g-preferably from 30 to 65 g. Any percentages, ratios or other quantities referred to herein are on a weight basis in grams, unless otherwise indicated.

Preparing the Adjuvants

Four different agricultural adjuvant compositions, in concentrate form, were prepared according to some of the embodiments of this disclosure. The concentrates adjuvants with high flash point and an epicuticular wax compatibility are indicated by ORO-009-K, ORO-009-T, ORO-079-FB and ORO-340. The details of the specific embodiments are shown in Table 2. Various components were employed in the different formulations, including soybean methyl ester-oil; cold pressed orange oil-oil; Polyoxyethylene sorbitan monolaurate-anionic surfactant; alcohol ethoxylated POE-6-nonionic surfactant; triethanolamine dodecylbenzene sulfonate-anionic surfactant; calcium dodecyl benzene sulfonate-anionic surfactant; sodium dodecyl benzene sulfonate-anionic surfactant; sodium lauryl ether sulfate-anionic surfactant; alcohol ethoxylated and propoxylated EOPO 6/9-nonionic surfactant; Isopropyl Myristate-oil, Methyl Laurate-oil, Isopropyl Laurate-oil.

Physico-Chemical and Accelerated Stability Tests

Samples of agricultural adjuvant compositions of certain embodiments were compared to commercially available products and analyzed to determine their physico-chemical characteristics and their properties when diluted in water, for example, pH and stability of an emulsion formed. Further, investigations were made regarding the pure (concentrate) adjuvant, for example, determining the flash point using a closed cup methodology described on CIPAC Handbook F-Collaborative International Pesticide Analytical Ltd, 1994, reprint in 2007, the contents of which are hereby incorporated by reference in their entirety. These commercially available products included from Oro Agri® the following products: WETCIT® (an adjuvant based on alcohol ethoxylated and orange oil), ORO-HSMSO® (an adjuvant based on a high surfactant methylated seed oil, TRANSFORMER® (an adjuvant soil conditioner based on alcohol secondary ethoxylated); and from Loveland Products: LI7X1: LI700—a soy-oil derived, non-ionic penetrating surfactant; and from Helena Chemicals: DNX1: Dyne-Amic—a blend of highly refined methylated seed oils in combination with specialized organosilicone-based nonionic surfactants; and from Winfield® United: CXU1: Succeed Ultra—a high surfactant methylated seed oil adjuvant available. It was determined that the agricultural adjuvant compositions prepared according to the embodiments exhibited stability in accelerated storage stability testing, and all samples were stable even in cold (14 days @ 0° C.) or hot conditions (14 days @ 54° C.). The stability results are shown in Table 3, 4 and Table 5.

TABLE 2

Agricultural Adjuvants Compositions (concentrates) made according the present disclosure

| Compound | ORO-009-K | ORO-009-T | ORO-079-FB | ORO-340 |
| --- | --- | --- | --- | --- |
| | | Amount (weight/weight %) | | |
| Isopropyl Myristate | 7.00 | — | 8.00 | 5.00 |
| Alkylated Seed Oil (soybean methyl ester) | — | — | — | 60.00 |
| Isopropyl Laurate | — | — | 2.00 | — |
| Methyl Laurate | — | 6.00 | — | — |
| Cold Pressed Orange Oil | — | 2.00 | — | — |
| Alcohol Ethoxylated 6 POE | 9.00 | 8.00 | 25.00 | 5.00 |
| Sodium Alkyl Benzene Sulfonate | 10.00 | 13.00 | — | — |
| Calcium Alkyl Benzene Sulfonate | — | — | — | 13.00 |
| Alcohol Ethoxylated and Propoxylated-EOPO 9 | — | — | — | 12.00 |
| Sodium lauryl ether sulfate | 8.00 | — | 12.00 | — |
| Polyoxyethylene sorbitan monolaurate | — | 7.00 | — | — |
| Other additives | 5.00 | 5.00 | 5.00 | 5.00 |
| Water | 65.00 | 59.00 | 48.00 | — |
| TOTAL (weight/weight %) | 100.0 | 100.0 | 100.0 | 100.0 |
| FORMULATION TYPE | Microemulsified | Microemulsified | Microemulsidified | Emulsifiable |

TABLE 3

Physical and Chemical and Accelerated Stability Tests results-agricultural adjuvant compositions made according this disclosure

| ANALYSIS | ORO-009-K | ORO-009-T | ORO-340 | ORO-079-FB |
|---|---|---|---|---|
| Appearance (product) | Clear Golden Liquid | Clear Golden Liquid | Clear Golden Liquid | Clear Golden Liquid |
| Density @ 20° C. | 1.009 | 1.008 | 0.9277 | 1.003 |
| pH (product) | 7.30 | 7.43 | — | 6.57 |
| PH (1 % v/v) | — | — | 6.78 | — |
| Viscosity @ 25° C. | 25 Cp | 34 Cp | 20 Cp | 22 Cp |
| Flash Point Closed Cup-CIPAC MT12 | >121.1° C. (>250° F.)* | >121.1° C. (>250° F.)* | >121.1° C. (>250° F.)* | >121.1° C. (>250° F.)* |
| Appearance (solution at 0.25%-distillated | Clear | Clear | Clear | Clear |
| Emulsion Stability (CIPAC MT 36) 1% v/v 2 hours @ 30° C. Water CIPAC A and D | No cream and No Oil | No cream and No Oil | No cream and No Oil | No cream and No Oil |
| Emulsion Stability Method CIPAC MT 36 1% v/v 24 h 30 hours re-emulsified at 30° C. Water CIPAC A and D | No cream and No Oil | No cream and No Oil | No cream and No Oil | No cream and No Oil |
| Accelerated Storage Procedure Method CIPAC MT 46 (14 days at 0°, 20° and 54° C.) | Stable | Stable | Stable | Stable |

(*)No flash point was achieved until the temperature described.

TABLE 4

Physical and Chemical Results for Oro Agri ® Commercially Available Products

| ANALYSIS | WETCIT ® | ORO-HSMSO ® | TRANSFORMER ® |
|---|---|---|---|
| Appearance (product) | Green Liquid | Clear Golden Liquid | Clear Golden Liquid |
| Density @ 20° C. | 1.020 | 0.923 | 1.002 |
| pH (product) | 5.80 | 4.55 | 5.93 |
| PH (0.5% v/v) | 5.60 | 4.08 | 6.20 |
| Viscosity @ 25° C. | 25 cP | 19 cP | 20 Cp |
| Flash Point-closed cup (@ 760 mmHg) | 68.8° C. (>212° F.) | 97.8° C. (197.24° F.) | 90.3° C. (194.5° F.) |
| Appearance (solution at 0.25%-distillated water) | Clear | Light Cloudy | Clear |
| Emulsion Stability Method CIPAC MT 36 1% v/v-2 hours @ 30° C. Water CIPAC A and D | No cream and No Oil | No cream and No Oil | No cream and No Oil |
| Emulsion Stability Method CIPAC MT 36 1% v/v-24 h 30 hours re-emulsified @ 30° C. Water CIPAC A and D | No cream and No Oil | No cream and No Oil | No cream and No Oil |
| Accelerated Storage Method CIPAC MT 46 (14 days at 0, 20 and 54° C.) | Stable | Stable | Stable |

TABLE 5

Physical and Chemical Results for Commercially Available Products used as Standards treatment

| ANALYSIS | DNX1 Dyne-Amic | CXU1 Succeed Ultra ® | LI7X1 Li700 ® |
|---|---|---|---|
| Appearance (product) | Clear Golden Liquid | Clear Golden Liquid | Black Liquid |
| Density @ 20° C. | 0.9069 | 0.9174 | 1.0350 |
| PH (0.5% v/v) | 5.93 | 5.20 | 3.3 |

TABLE 5-continued

| Physical and Chemical Results for Commercially Available Products used as Standards treatment | | | |
|---|---|---|---|
| ANALYSIS | DNX1 Dyne-Amic | CXU1 Succeed Ultra ® | LI7X1 Li700 ® |
| Appearance (solution at 0.25%-distillated water) | Cloudy | Cloudy | Cloudy |
| Emulsion Stability Method CIPAC MT 36 1% v/v-2 hours @ 30° C. Water CIPAC A and D | No cream and No Oil | Traces of cream and No Oil | No cream and No Oil |
| Emulsion Stability Method CIPAC MT 36 1% v/v-24 h 30 hours re-emulsified @ 30° C. Water-CIPAC A and D | No cream and Traces of Oil | Traces of cream and No Oil | No cream and No Oil |

Field Trials to Evaluate Agricultural Adjuvant Compositions Made According this Disclosure and Comparing Against Existing Products Study 1.

Adjuvant x Adjuvant rate effect on wheat cover crop burndown with glyphosate at full tillering stage.

Methods Summary:

A bifactorial trial was conducted consisting of 29 treatments, comprised of a combination of 10 adjuvants (factor A) and 2 adjuvants rates (factor B), plus three reference treatments (Table 6).

Prior to treatment application, two plots per block were chosen to record wheat height and tiller number per plant. In each plot, the height of the tallest and shortest plant was measured, and the tillers counted.

Herbicide application was done using a single-nozzle boom connected to a backpack $CO_2$ pressurized system. Each plot measured 3 ft×20 ft. After 14 and 28 days of application, wheat desiccation was evaluated visually using a 0-100% scale, where 0 corresponds to absence of injury symptoms and 100% corresponds to plant death. Additional information regarding herbicide application and other variables are shown in Tables 6 to 10.

Table 6: Adjuvant x Adjuvant Rate Treatments Tested for Wheat Burndown with Glyphosate (420 g Ae/Ha) at Full Tillering, Fayetteville, Arkansas, 2018.

TABLE 6

| Adjuvant x adjuvant rate treatments tested for wheat burndown with glyphosate (420 g ae/ha) at full tillering, Fayetteville, Arkansas, 2018. | | |
|---|---|---|
| Treatment[1] | Adjuvant | Adjuvant rate |
| 1 | Non-treated check/control | — |
| 2 | No adjuvant | — |
| 3 | Ammonium sulfate | 10 g/L |
| 4 | OR-340 | 0.125% v/v |
| 5 | TRM-TRANSFORMER ® | 0.125% v/v |
| 6 | WCT-WETCIT ® | 0.125% v/v |
| 8 | LI7X1:Li700 ® | 0.125% v/v |
| 10 | OR-079-FB | 0.125% v/v |
| 11 | ORO-HSMSO ® | 0.125% v/v |
| 13 | OR-009-K | 0.125% v/v |
| 14 | OR-009-T | 0.125% v/v |
| 15 | DNX1-Dyne-Amic ® | 0.125% v/v |
| 16 | CXU1-Succeed Ultra ® | 0.125% v/v |
| 17 | OR-340 | 0.25% v/v |
| 18 | TRM-TRANSFORMER ® | 0.25% v/v |
| 19 | WCT-WETCIT ® | 0.25% v/v |
| 21 | LI7X1:Li700 | 0.25% v/v |
| 23 | OR-079-FB | 0.25% v/v |

TABLE 6-continued

| Adjuvant x adjuvant rate treatments tested for wheat burndown with glyphosate (420 g ae/ha) at full tillering, Fayetteville, Arkansas, 2018. | | |
|---|---|---|
| Treatment[1] | Adjuvant | Adjuvant rate |
| 24 | ORO-HSMSO ® | 0.25% v/v |
| 26 | OR-009-K | 0.25% v/v |
| 27 | OR-009-T | 0.25% v/v |
| 28 | DNX1-Dyne-Amic ® | 0.25% v/v |
| 29 | CXU1-Succeed Ultra ® | 0.25% v/v |

[1]Except for the check/control, all treatments included glyphosate (Roundup ® Powermax ® 4.5 lb/gal) at 420 g ae/ha, which represents 1/2 of a full dose.

TABLE 7

| General information regarding application and trial details, wheat burndown with glyphosate, Fayetteville, AR, Spring 2018. | |
|---|---|
| Particulars | Data |
| Application date | Mar. 21, 2018 |
| Time of day | 5:30-7:30 |
| Air temperature | 54.5 F. |
| Relative humidity | 46% |
| Wind velocity | 4.4 mph |
| Nozzle type | XR 8004 EVS |
| GPA | 15 |
| Herbicide | Roundup® Powermax ® 4.5 lb/gal |
| Herbicide rate | 420 g ae/ha |

TABLE 8

| Height and number of tillers of the tallest and shortest wheat plants in two plots per block, wheat burndown test with 420 g ae/ha glyphosate, Fayetteville, AR, Spring 2018. | | |
|---|---|---|
| Block | Height (cm)[1] | Tiller number[2] |
| 1 | 27-43 | 7-12 |
|  | 34-56 | 8-15 |
| 2 | 38-62 | 10-14 |
|  | 30-44 | 7-10 |
| 3 | 37-48 | 6-9 |
|  | 52-58 | 7-10 |
| 4 | 31-51 | 8-10 |
|  | 39-55 | 7-9 |

[1]Heights were measured from the soil surface to the tip of the longest leaf at vegetative stage
[2]Tillers were counted from the same plant from which height was measured

TABLE 9

Treatment means for wheat desiccation at 14 and 28 days after treatment with 420 g ae/ha glyphosate and novel adjuvants, Fayetteville, AR, Spring 2018.

| | Wheat desiccation (%) | | | |
| --- | --- | --- | --- | --- |
| | 14 DAT Adjuvant rate | | 28 DAT Adjuvant rate | |
| Adjuvant | 0.125% v/v | 0.25% v/v | 0.125% v/v | 0.25% v/v |
| No adjuvant | 72.5 ABCDE[1] | | 91.25 ABCD | |
| Ammonium sulfate | 80 A | | 95 A | |
| OR-340 | 68.8 ABCDE | 63.8 ABCDE | 87.3 ABCDE | 86.3 ABCDEF |
| TRM-TRANSFORMER ® | 65.0 ABCDE | 62.5 ABCDE | 83.8 ABCDEF | 80.0 ABCDEF |
| WCT-WETCIT ® | 65.0 ABCDE | 56.3 CDE | 87.5 ABCDE | 72.5 EF |
| LI7X1: Li700 ® | 65.0 ABCDE | 57.5 CDE | 82.5 ABCDEF | 77.5 BCDEF |
| OR-079-FB | 73.8 ABCD | 77.5 AB | 93.5 AB | 92.5 ABC |
| ORO-HSMSO ® | 61.3 ABCDE | 53.8 E | 70.0 F | 72.5 EF |
| OR-009-K | 66.3 ABCDE | 70.0 ABCDE | 88.8 ABCDE | 87.5 ABCDE |
| OR-009-T | 66.3 ABCDE | 66.3 ABCDE | 86.3 ABCDEF | 84.8 ABCDEF |
| DNX1-Dyne-Amic ® | 62.5 ABCDE | 56.3 CDE | 88.8 ABCDE | 78.8 BCDEF |
| CXU1-Succeed Ultra ® | 66.3 ABCDE | 55.0 DE | 88.5 ABCDE | 78.8 BCDEF |
| Tukey HSD 0.05 | | | 3.8641 | |

[1]Letters treatment means from the same evaluation date (14 or 28 DAT)

TABLE 10

Analysis of variance for the interaction effect of adjuvant and adjuvant rate on efficacy of glyphosate (420 g ae/ha) for wheat desiccation at 14 and 28 days after treatment, Fayetteville, AR, Spring 2018.

| Source | DF num | SS | MS Num | F Ratio | Prob > F |
| --- | --- | --- | --- | --- | --- |
| | 14 DAT | | | | |
| Adjuvant | 12 | 2380.29 | 198.357 | 4.2424 | <.0001 |
| Adjuvant rate | 1 | 808.654 | 808.654 | 17.295 | <.0001 |
| Adjuvant* Adjuvant rate | 12 | 760.096 | 63.3413 | 1.3547 | 0.2071 |
| Rep&Random | 3 | 2005.77 | 668.59 | 14.2994 | <.0001 |
| | 28 DAT | | | | |
| Adjuvant | 12 | 3118.712 | 259.893 | 6.2709 | <.0001 |
| Adjuvant rate | 1 | 416.000 | 416.000 | 10.0376 | 0.0022 |
| Adjuvant* Adjuvant rate | 12 | 560.750 | 46.729 | 1.1275 | 0.3515 |
| Rep&Random | 3 | 454.692 | 151.564 | 3.6571 | 0.0161 |

The interaction effect was not significant; therefore, main effects were analyzed separately and means are shown in Tables 11 and 12.

TABLE 11

Main effect of adjuvants on wheat desiccation with glyphosate (420 g ae/ha) at 14 and 28 days after application, averaged across adjuvant rates, Fayetteville, AR, Spring 2018.

| | Wheat desiccation (%) | | | |
| --- | --- | --- | --- | --- |
| Adjuvant | 14 DAT | | 28 DAT | |
| OR-079-FB | 75.6 | A[1] | 93.0 | A |
| OR-009-K | 68.1 | AB | 88.1 | AB |
| OR-009-T | 66.3 | AB | 85.5 | ABCD |
| OR-340 | 66.3 | AB | 86.8 | ABC |
| TRANSFORMER ® | 63.8 | B | 81.9 | BCDE |
| LI7X1:Li700 ® | 61.3 | B | 80.0 | BCDE |
| CXU1-Succeed Ultra ® | 60.6 | B | 83.6 | ABCD |
| WETCIT ® | 60.6 | B | 80.0 | BCDE |
| DNX1-Dyne-Amic ® | 59.4 | B | 83.8 | ABCD |
| ORO-HSMSO ® | 57.5 | B | 71.3 | E |
| Tukey HSD 0.05 | | | 3.422 | |

[1]Letters compare treatments at the same evaluation date (14 or 28 DAT)

TABLE 12

Main effect of adjuvant rates on wheat desiccation with glyphosate (420 g ae/ha) at 14 and 28 days after application, averaged across adjuvants, Fayetteville, AR, Spring 2018.

| | Wheat desiccation (%) | | | |
| --- | --- | --- | --- | --- |
| Adjuvant rate | 14 DAT | | 28 DAT | |
| 0.125% v/v | 66.6 | A[1] | 84.3 | A |
| 0.25% v/v | 61.1 | B | 80.3 | B |
| Student's t 0.05 | | | 1.9921 | |

[1]Letters compares treatments from the same evaluation date (14 or 28 DAT)

Conclusions

This test was conducted using half rate of glyphosate to detect differences between adjuvant formulations under suboptimal herbicide dose. Under these conditions, the following can be concluded: Three adjuvants made according the present disclosure performed numerically better than the commercial standards Dyne-Amic® and Succeed Ultra® and the Oro Agri's products: they are OR-079-FB; OR-009-K; and OR-340. The adjuvant according to this disclosure performed similar to other commercial products is OR-009-T. Regarding adjuvant concentration, 0.125% was generally better than 0.25% by volume. This is very advantageous.

Some advantages of the agricultural adjuvant composition according to this disclosure includes a high flash point and a low evaporation rate which in use solubilizes epicuticular wax of leaves or roots covering the surface. This in turn enhances substantially the biological performance of insecticides, fungicides, miticides, nematicides, herbicides, plant growth regulators, insecticide growth regulators, nutrients and other agrochemicals.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles suchas "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reagents, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A liquid agricultural adjuvant, consisting of:
   from 0.1 wt. % to 20 wt. % of at least one alkyl ($C_1$-$C_8$) ester of an alkyl ($C_{12}$-$C_{16}$) acid, wherein the at least one alkyl (C1-C8) ester of an alkyl (C12-C16) acid is selected from the group consisting of isobutyl laurate, isopentyl laurate, isopropyl laurate, isopropyl myristate, and combinations thereof;
   from 1 wt. % to 50 wt. % of at least one anionic surfactant, wherein the at least one anionic surfactant is selected from the group consisting of: ($C_6$-$C_{18}$) alkyl benzene sulfonic acid salts, calcium dodecylbenzene sulfonate, sodium dodecylbenzene sulfonate, amine ($C_6$-$C_{18}$)

alkyl benzene sulfonate, triethanolamine dodecylbenzene sulfonates, $(C_6\text{-}C_{18})$ alkyl ether sulfates, $(C_6\text{-}C_{18})$ alkyl ethoxylated ether sulfates, $(C_6\text{-}C_{18})$ alkyl sulfates, lauryl ether polyethoxylated sodium sulfate, $(C_6\text{-}C_8)$ alkyl phosphate esters, $(C_6\text{-}C_{18})$ alkoxylated sulfates, $(C_6\text{-}C_{18})$ alkoxylated phosphate esters, xylene sulfonate salts, cumene sulfonate salts and combinations thereof;

from 1 wt. % to 50 wt. % of an at least one nonionic surfactant, wherein the at least one nonionic surfactant is selected from the group consisting of: $(C_8\text{-}C_{22})$ alkoxylated fatty alcohols, $(C_8\text{-}C_{22})$ ethoxylated fatty alcohols, $(C_8\text{-}C_{22})$ propoxylated fatty alcohols, $(C_8\text{-}C_{22})$ ethoxylated and propoxylated fatty alcohols, straight chain $(C_4\text{-}C_{10})$ alkyl(poly)glycosides, branched chain $(C_4\text{-}C_{10})$ alkyl(poly)glycosides; and alkoxylated sorbitan fatty esters, alkoxylated sorbitol fatty esters, ethoxylated sorbitan fatty esters, ethoxylated sorbitol fatty esters, polyoxyethylene sorbitan monolaurate, polyoxyethylene sorbitan monopalmitate, polyoxyethylene sorbitan monostearate, and combinations thereof; and from 2 wt. % to 80 wt. % of water and additives selected from the group consisting of preservatives, clarifiers, anti-freezing agents, hydrotropes, stabilizers, antioxidants, dyes, rheology modifiers, antifoams, anti-drift and water, oil or other solvents, and combinations thereof;

wherein the liquid agricultural adjuvant has a flash point higher than about 100° C.; and wherein the at least one alkyl $(C_1\text{-}C_8)$ esters of alkyl $(C_{12}\text{-}C_{16})$ acid has a paraffinic wax dissolution capability of between 2 to 20 wt. % at 25° C.

2. The liquid agricultural adjuvant of claim 1, wherein the ethoxylated alcohols have a degree of ethoxylation from 1 to 50.

3. The liquid agricultural adjuvant of claim 1, wherein the at least one alkyl $(C_1\text{-}C_8)$ ester of an alkyl $(C_{12}\text{-}C_{16})$ acid is present in an amount of between about 2 wt. % to about 15 wt. %; wherein the at least one anionic surfactants is present in an amount of between about 3 wt. % to about 20 wt. %; and wherein the at least one nonionic surfactant is present in an amount of between about 5 wt. % to about 30 wt. %.

4. A method of diluting a liquid agricultural adjuvant, comprising:

diluting the adjuvant concentrate prepared according of claim 1 with water at a ratio by weight of liquid agricultural adjuvant to water 1:5000 to 1:10 to yield a stable diluted emulsion and/or microemulsion.

5. The method of claim 4, wherein the water further contains at least one agricultural compound selected from the group consisting of: insecticides, fungicides, herbicides, desiccants, defoliants, acaricides, nutrients, miticides, bactericides, biocides, ovicides, nematicides, insect growth regulators, plant growth regulators, and combinations thereof.

6. The method of claim 5, wherein the liquid agricultural adjuvant is diluted in a mixing tank, a spray tank, a container, or an inline irrigation system.

7. The method of claim 6, wherein the stable diluted emulsion and/or microemulsion is applied on at least one member selected from the group consisting of: plants, weeds, seeds, soil, urban places, and forests, via an apparatus selected from the group comprising: air assisted sprayers, conventional sprayers, ultra-low volumes equipment such as aerial, electrostatic, foggers and misting spray equipment and chemigation systems, pivots, sprinklers, and combinations thereof.

\* \* \* \* \*